US008325469B2

(12) United States Patent
Bernard et al.

(10) Patent No.: US 8,325,469 B2
(45) Date of Patent: Dec. 4, 2012

(54) RECONFIGURABLE USER-INTERFACE DEVICE

(75) Inventors: Stefano Bernard, Orbassano (IT); Giorgio Masoero, Orbassano (IT); Cosimo Carvignese, Orbassano (IT); Diego Marzorati, Orbassano (IT)

(73) Assignee: C.R.F. Societa Consortile per Azioni, Orbassano (Turin) (IT)

( * ) Notice: Subject to any disclaimer, the term of this patent is extended or adjusted under 35 U.S.C. 154(b) by 234 days.

(21) Appl. No.: 12/934,901

(22) PCT Filed: Jan. 25, 2010

(86) PCT No.: PCT/IB2010/050321

§ 371 (c)(1), (2), (4) Date: Sep. 27, 2010

(87) PCT Pub. No.: WO2010/092498

PCT Pub. Date: Aug. 19, 2010

(65) Prior Publication Data

US 2011/0026206 A1 Feb. 3, 2011

(30) Foreign Application Priority Data

Feb. 11, 2009 (EP) .................................... 09425049

(51) Int. Cl.
*G06F 1/16* (2006.01)

(52) U.S. Cl. .............. 361/679.01; 715/810; 174/117 M; 439/498

(58) Field of Classification Search .................. 715/229, 715/810, 764; 345/156, 173, 174, 629, 473, 345/176, 36, 168, 520, 184; 126/696, 684; 136/244, 248, 251; 174/548, 59, 520, 50.52, 174/50, 117 M; 361/679.01, 679.31, 679.32, 361/679.33, 679.46, 679.47, 679.53, 679.54, 361/695, 710, 714, 783, 810; 439/540.1, 439/775, 801, 485, 575, 76.1, 498, 365; 29/739, 29/747, 428, 592.1
See application file for complete search history.

(56) References Cited

U.S. PATENT DOCUMENTS

| | | | | |
|---|---|---|---|---|
| 8,074,163 | B2 * | 12/2011 | Nishimura et al. | 715/229 |
| 2003/0142070 | A1 * | 7/2003 | Gartrell et al. | 345/156 |
| 2004/0155868 | A1 | 8/2004 | Hui | |
| 2008/0142352 | A1 * | 6/2008 | Wright | 200/600 |

OTHER PUBLICATIONS

"Customizable Keys Using Add-On Plugs", IBM Technical Disclosure Bulletin, vol. 33, No. 1B, (Jun. 1990), pp. 426-429.
Written Opinion of the International Searching Authority for PCT/IB2010/050321, mailed May 7, 2010.

* cited by examiner

*Primary Examiner* — Hung Duong
(74) *Attorney, Agent, or Firm* — Nixon & Vanderhye, P.C.

(57) ABSTRACT

A user-interface device comprises a plurality of indication elements (3), each provided with a visual indication (4), mounted on a structure (5). The indication elements (3) comprise identification means (9*b*, 10, 11, 11') adapted for co-operating with detection means (6, 7) of the device (1), for unique identification the indication elements (3). The identification means (9*b*, 10, 11, 11') comprise an electrically conductive layer (10) on a respective side face (6*b*) of the indication element (3) and an electrically insulating layer (9*b*) superimposed on the electrically conductive layer. The detection means (6, 7) comprise one or more contact elements (7) set up against a respective a side face (6*b*) of the indication element (3). The electrically insulating layer (9*b*) has one or more windows (11) for exposure of respective local portions of the underlying electrically conductive layer (10), each window (11) being made in a position substantially corresponding to a respective contact element (7).

15 Claims, 4 Drawing Sheets

Fig. 3
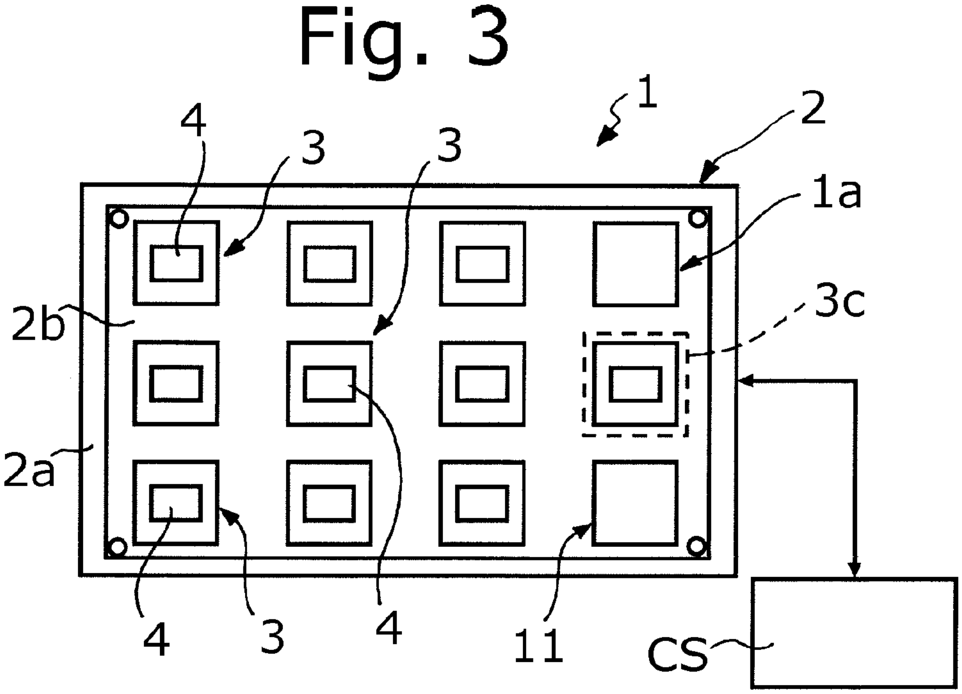
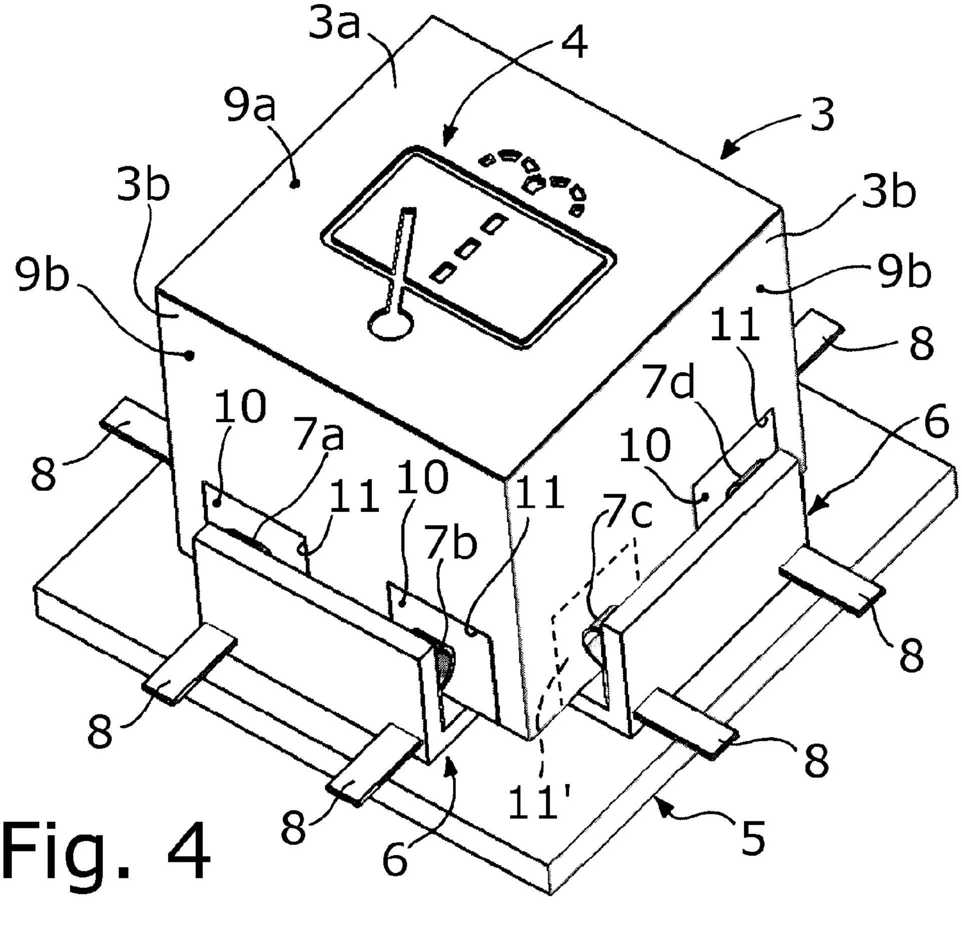
Fig. 4

RECONFIGURABLE USER-INTERFACE DEVICE

This application is the U.S. national phase of International Application No. PCT/IB2010/050321 filed 25 Jan. 2010, which designated the U.S. and claims priority to EP Application No. 09425049.5 filed 11 Feb. 2009, the entire contents of each of which are hereby incorporated by reference.

The present invention relates to a user-interface device, comprising a plurality of indication elements for display of information and/or input of commands or data.

More in particular, the invention relates to a user-interface device that can be configured or reconfigured according to the need, namely, of the type in which indication elements can be variously positioned in the device, but in any case in such a way that they can be uniquely identified by an electronics to which the device itself is connected.

Known to the art are devices designed to guarantee reconfigurability of a keyboard or, in general, of a user-interface device.

For example, the document No. US 2004/0155868—to the introductory part of which the reader is referred also for a general discussion on reconfigurable user-interface devices—describes a device designed to render the keys of an interface system uniquely recognizable. With reference to FIG. 1 annexed hereto, which reproduces FIGS. 8A-8C of the aforesaid document, added for this purpose, in a position corresponding to a lower surface of each key 110, is an additional component 130, which has a pair of projecting portions 131, 132, set in unique configurations for each key. When the key is depressed, the aforesaid unique configuration of projecting portions comes into contact with a conductive detection grid 140, set on the body of a keyboard, which identifies the key that has been pressed. The system described presents considerable complications in the production step, since the step of moulding of the body of the key must be followed by the step of painting of a visual indication, representing a function or an alphanumeric character and, at the end, the addition of the aforesaid component bearing the configuration of projecting portions that is designed to render the key recognizable. The component provided with the projecting portions must be glued to the body of the key, with care taken that there is perfect correspondence between the visual indication and the configuration of projecting portions, or else may be moulded together with the body of the key. In either case, however, the process of production is complicated and requires adequate checks for verifying that no confusion is generated between the visual indications represented and the configurations of projecting portions.

The document No. U.S. Pat. No. 6,891,528 describes a keyboard for disabled persons, in which each key 200 (see the annexed FIG. 2 that reproduces FIG. 1 of the aforesaid document) is identified uniquely by a combination of metal cylinders 224, which can be inserted within eight cylindrical cavities 222 formed at one end of the body of the key. As in the case of the document No. US 2004/0155868, also this solution, which is explicitly aimed at application on keypads of personal computers, presents considerable complications of the production stage, since the step of moulding of the body of the key must necessarily be followed by a step of painting of a visual indication on the top surface of the key itself, such as an alphanumeric character or an icon representing the function associated to the key. Next, the metal cylinders 224 must be inserted into the corresponding cavities 222, in positions and number established by appropriate encoding and in a way consistent with the visual indication provided on the key. Alternatively, the aforesaid cylinders can be printed directly together with the body of the key, also in this case, however, with considerable complication of the production process.

As has been explained, the interface devices described in the aforesaid prior documents present non-negligible complications from the standpoint of the production process. The main aim of the present invention is to overcome the aforesaid drawbacks. With a view to achieving said aim, the subject of the invention is a device according to claim 1 and a method according to claim 13. The dependent claims regard further preferred and advantageous characteristics of the present invention. The contents of the claims are to be considered as forming an integral part of the present description.

The aforesaid known interface devices cannot, moreover, be equipped with a system for back-lighting of the visual indications provided on the keys. Another aim of the invention is hence to solve said drawback, in a simple and economically advantageous way, guaranteeing that each visual indication of the user-interface device is effectively and uniformly lit up.

The invention will now be described with reference to the annexed drawings, which are provided purely by way of non-limiting example and in which:

FIG. 3 illustrates in a schematic form a user-interface device according to the present invention;

FIG. 4 illustrates a perspective view of a generic embodiment of a part of the device of FIG. 3;

Figure 1:
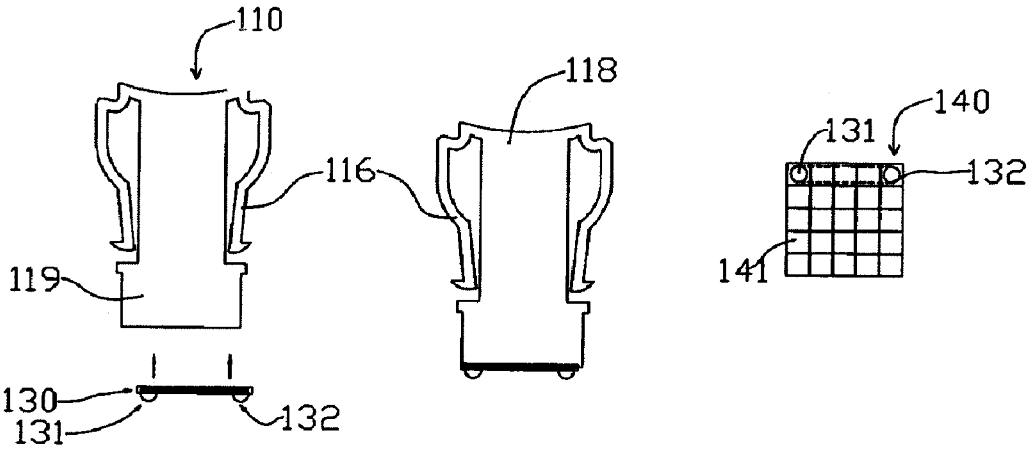
FIG. 1 illustrates a device according to a known technique described previously.
Figure 2:
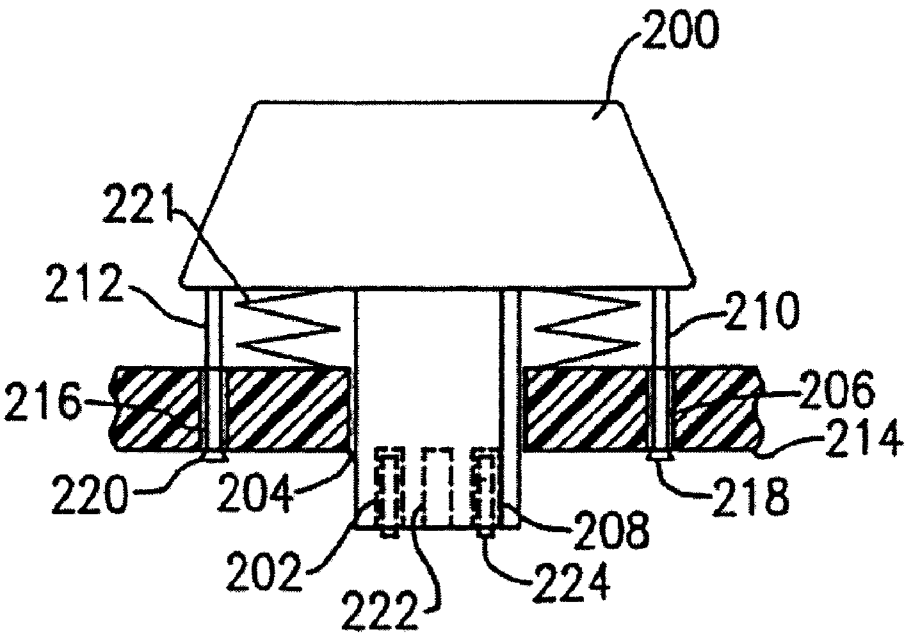
FIG. 2 illustrates another device according to a known technique described previously.
Figure 5:
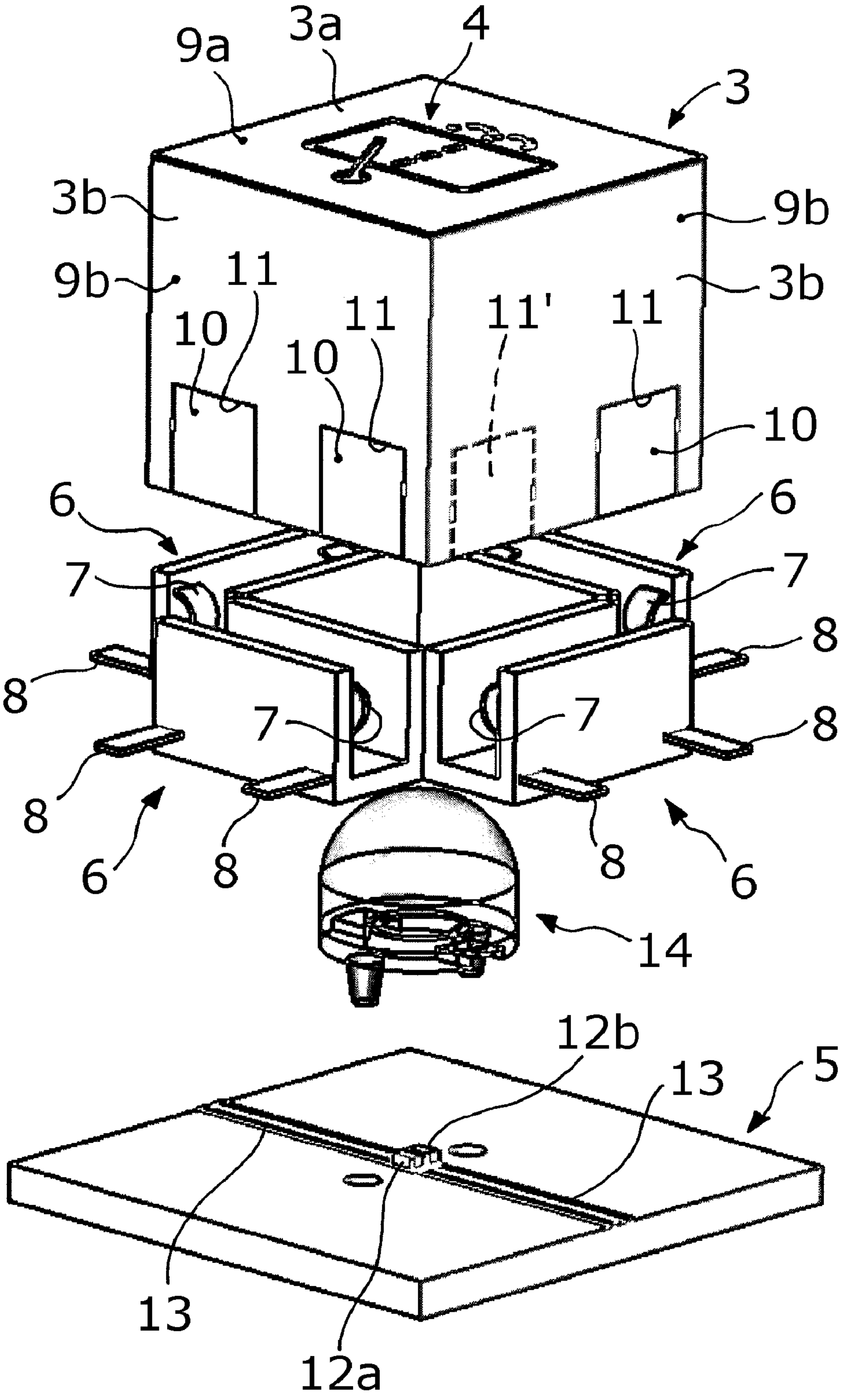
FIG. 5 illustrates an exploded view of the part of FIG. 4.

Represented schematically in FIGS. 3-7 is a possible embodiment of a reconfigurable user-interface device according to the present invention. In the ensuing description the invention will be presented in relation to the use of the device in a dashboard of a motor vehicle. However, the invention must be understood as being applicable also in other contexts, and in general in the case of any user interface with indication elements with positioning that can be variously configured according to the need.

In FIG. 3, designated as a whole by 1 is a user-interface device according to the invention, for a dashboard of a motor vehicle, operatively connected to an on-board electronics, or control system CS. In the example illustrated, the device 1 comprises a supporting structure, such as a substantially box-type body 2, the front wall 2*a* of which is provided with openings, installed at which are respective indication elements 3, for the display or representation of information; for this purpose each element 3 is provided, on an exposed upper surface thereof, with an indication 4, represented by a wording, an icon, or a generic symbol or character (alphabetic, numeric, alphanumeric, or abstract). In the example, two openings of the device 1 are not occupied by any indication elements 2, and are closed for this purpose by a corresponding removable cover 1*a*. The device 1 is in any case pre-arranged for housing, at said openings, respective elements 2, after prior removal of the covers 1*a*.

The indication elements 3 are mounted in a repositionable way on the device 1, or they can be mounted in different positions on the device itself, according to the need. For said purpose, as will emerge clearly hereinafter, the elements 3 are provided with respective identification means, designed to co-operate with detection means provided in the device 1, said detection means being connected to the control system CS, which is pre-arranged for recognizing in a unique way the individual identity of the elements 3, irrespective of the position assigned thereto within the device 1.

In FIGS. 4-7 the user interface 1 is illustrated in a way limited to the part corresponding to a single indication element 3.

In said FIGS. 4-7, designated by 5 is a portion of a substrate or base, which is substantially plane, preferably made of electrically insulating material. Mounted on the base 5 is at least one connection means 6, or connector, having preferably a body made of electrically insulating material, associated to which is at least one electrical contact 7, connected to a respective conductive path 8 (it may be noted that, only in FIG. 3, associated to the reference "7" of the visible contacts are the letters "a", "b", "c" and "d", for purposes of subsequent description of a possible recognition or identification logic). In the example represented, fixed to the base 5 are, for the element 3, four connectors 6 set orthogonal to one another, each having a body provided with two contacts 7. As may be noted, for example in FIG. 6, the contacts 7 are located within a seat, designated by 6*a*, defined by the body of the connector 6, which for said purpose has a substantially U-shaped cross section. The corresponding conductive paths 8 project externally with respect to the body of the connector 6, in order to be connected to the control system CS of FIG. 1, which is of a conception in itself known. The active part of the contacts 7, designated by 7' only in FIG. 6 (i.e., the part designed to perform the actual function of electrical contact) is located within a maximum height "$d_1$" with respect to the base 5.

Designated by 3 is one of the indication elements, which, in the example represented, is constituted by a body of a substantially parallelepipedal shape, having an upper wall 3*a* and four side walls 3*b*. As may be noted in FIGS. 4, 6 and 7, the lower region of at least one side wall 3*b* of the body 3 can be received in the seat of a respective connector 6; in the example represented, each wall 3*b* of the body 3 is hence inserted in a respective connector 6.

The upper wall 3*a* of the body 3, designed to remain exposed by the device 1, has a face provided externally with the visual indication 4. For said purpose, in the preferred embodiment of the invention, the outer face of the wall 3*a* is coated with a layer of paint 9*a*, preferably an optically non-transmissive paint, in which the indication 4 is made. The indication 4 can be, for example, obtained by laser ablation, chemical etching, or any other method adapted to remove partially, according to a desired pattern, the layer 9*a*, leaving the underlying material of the body 3, which has different colouring with respect to that of the paint of the layer 9*a*, exposed. Another possibility is to deposit the layer 9*a* in a selective way in order to coat the surface of the wall 3*a* except in the region of the pattern desired for the indication 4.

According to one characteristic of the invention, the face of at least one of the side walls 3*b* of the body 3 is coated at least in part by a layer of electrically conductive paint, designated by 10 and also referred to hereinafter as "conductive layer". The paint that constitutes the layer 10 may, for example, be obtained by introducing a filler of metal particles into a polymeric base. In the example, the layer 10 coats a lower region of the external faces of the walls 3*b*, for a band that extends from the lower edge of the walls themselves up to a height at least equal to $d_1$.

Superimposed on the conductive layer 10 is a layer of electrically insulating paint, designated by 9*b* and also referred to hereinafter as "insulating layer". The layer 9*b* can substantially coat entirely the external face or faces of the walls 3*b* and can belong to the layer 9*a* deposited on the top wall 3*a*; in this case, deposition of the non-conductive paint is obtained substantially simultaneously on the external faces 3*a* and 3*b*, for example, by spraying or dipping.

According to another characteristic of the invention, the insulating layer 9*b* has one or more windows 11 in given positions, which enable local exposure of the underlying conductive layer 10, said windows 11 having a height at least equal to $d_1$ and being obtained in positions substantially coinciding with electrical contacts 7 of the connectors 6. It may be noted, however, that in a position corresponding to each contact 7 not necessarily a window 11 is provided. In other words, following upon assembly of the device, the contact 7 of a connector 6 can be located in a position corresponding to a local portion of the insulating layer 9*b*, determined by the absence of a window 11; merely by way of example, one such local portion of the insulating layer 9*b* is designated by 11' in FIGS. 4 and 5.

In a particularly advantageous embodiment of the invention the windows 11 are made with the same process used for obtaining the indication 4 on the layer of paint 9*a* deposited on the wall 3*b* so that, in one and the same processing step, and without any possibility of confusion, there will be made on the body 3 both the indication 4 and the corresponding succession of windows 11.

When the lower region of a side wall 3*b* is inserted in a corresponding connector 6, the contacts 7 set themselves up against the outer face of the wall itself, sliding thereon. In this way, the correspondence of a contact 7 with a window 11 opened on the conductive layer 10 or with a local portion 11' of insulating layer 9*b* determines a binary succession, which enables the control system CS to which the device is connected to identify the identity of the indication element represented by the body 3 in a unique way. In the preferred embodiment, the contacts 7 are at least in part elastically deformable, in order to be coupled with the body 3, and in particular are configured in such a way that their active part 7' is elastically pressed on the respective faces of the body 3, following upon coupling with the connectors 6; thanks to said characteristic, the electrical contact between the parts is improved, and the elastic reaction of the contacts 7 on the walls 3*b* ensures positioning of the body 3 without any vibrations.

In a preferred embodiment, the device 1 is provided with preferential or unique positioning means, for positioning the body 3 on the base 5, said means being arranged so as to prevent assembly of the body 3 on the base 5 with an orientation different from the design orientation. Said means can be obtained with any known modality; for said purpose, there may, for example, be provided one or more body references on the walls 3*b* and corresponding structures or seats on the base 5, or else pins may be provided on the lower face of the walls 3*b* and coinciding seats or passages on the base 5 (or vice versa): in this way, it is also possible to define in a unique and repeatable way one of the contacts 7 as reference contact, and likewise a corresponding window 11.

The methodologies for recognition of the succession of correspondences between the contacts 7 and the windows 11 or local portions 11', performed by the control system CS, may be multiple. For example, by connecting a reference contact 7 to the positive pole of a voltage generator, via another contact 7 corresponding to a window 11 the control system CS can detect a passage of current from the aforesaid reference contact 7, through the conductive layer 10. In this way, the succession of the correspondences of the windows 11 and local portions 11' with the contacts 7 that are not reference contacts results in a succession of passage and non-passages of current, which can be interpreted substantially as digital signals in binary code. If we assume, by way of example, that for each face 3*b* of the body 3 two contacts 7 are present, of which a reference one, then the succession of readings of passage of current (correspondence between non-reference contact 7 and window 11) and of non-passage of current (contact 7 corresponding to a local portion 11') there will be formed seven binary states (passage or non-passage), for a total of $2^7=128$ possible different combinations. Once again purely by way of example and with reference to FIG. 4, if we consider the contact designated by 7*a* as reference contact, the succession (in a counterclockwise direction and in a way limited to the contacts visible in the figure) shows a correspondence between the contact 7*b* and the window 11 (passage), a correspondence between the contact 7*c* and the portion 11' (non-passage), and a correspondence between the contact 7*d* and the window 11 (passage). This succession of correspondences can be indicated, in a binary form, as "1 0 1" and can be perfectly interpreted by a digital control logic of the system CS, with modalities in themselves known. In this way, the system CS is hence able to recognize the identity of the various elements 3, as well as the position assigned thereto within the device 1.

In a preferred embodiment, irrespective of the reading method followed by the electronics CS for recognizing the succession of the correspondences between the contacts 7 and the windows 11 or local portions 11', said method is set under way upon switching-on of the engine of the motor vehicle in order to identify a plurality of elements 3 belonging to the device 1, provided with corresponding indications 4, and all the information of identification and positioning is stored in memory means of the system CS. In another possible embodiment, and once again irrespective of the reading method, the information of identification and positioning of a plurality of elements 3 is stored in a durable way in memory means of the on-board electronics CS and is again stored (or modified in memory) only following upon an explicit command issued by the user, via a suitable input means (such as a key), particularly following upon change of the arrangement of the elements 3 on the dashboard that constitutes the user interface.

From what has been described previously, it may be understood how, in the user-interface device 1 according to the invention, the arrangement of the indication elements 3 can be configured according to the requirements, thanks to the presence of the identification means 9*b*, 10, 11, 11' and of the detection means 6, 7, CS. For example, the device 1 can be equipped with different indication elements 3 according to the type of model of motor vehicle or to the corresponding on-board equipment (standard/optional). Likewise, the arrangement of the elements 3 that equip the device 1 can be varied subsequently, for example, according to the requirements or preferences of the final user, by simply repositioning the elements themselves within the openings provided in the device 1, at which, within the body 2, the corresponding connectors 6 are positioned. It emerges also clearly that, according to the invention, new indication elements 3 can be added to the ones originally provided on the device 1. With reference to the example of FIG. 1, for said purpose it is sufficient to remove the cover 1*a* in the position of interest, and insert an element 3 that will be coupled to an underlying connector or plurality of connectors 6.

The device 1 is preferably provided with means for securing in a removable way the elements 3 in the respective positions, it being possible also for said means to be obtained with any known modality. For example, with reference to FIG. 3, the front wall 2*a* of the body 2 is provided with the openings for positioning the elements 3, and fixed on said wall in a removable way 2*a*, for example, with screws, is a front fascia 2*b*, provided with passages corresponding to the aforesaid openings. The body of the elements 3 is provided with at least one peripheral projection—which, in the example, is constituted by a flange 3*c* represented for a single element 3—designed to remain set between the w all 2*a* and the fascia 2*b*, so as to keep the elements 3 in position. Another possibility is, for example, that of providing releasable snap-action engagement means between the elements 3 and the body 2 and/or the base 5.

In a particularly advantageous embodiment of the invention, which may form the subject of an independent patent protection, associated to one or more reference elements 3 is a back-lighting system.

For said purpose, the body 3 is hollow and is made of a transparent plastic material, such as, for example, polymethyl methacrylate or polycarbonate, and associated to the base 5 are light-generating means. In the example illustrated, said means comprise two distinct light sources 12*a* and 12*b*, supplied via electrically conductive paths 13, connected to an electrical-supply source (not represented). The sources 12*a*, 12*b* are preferably semiconductor sources, such as LED sources adapted to be mounted with surface-mount technology (SMT), or else chipLED sources, adapted to be mounted with chip-on-board (COB) technology.

Figure 6:
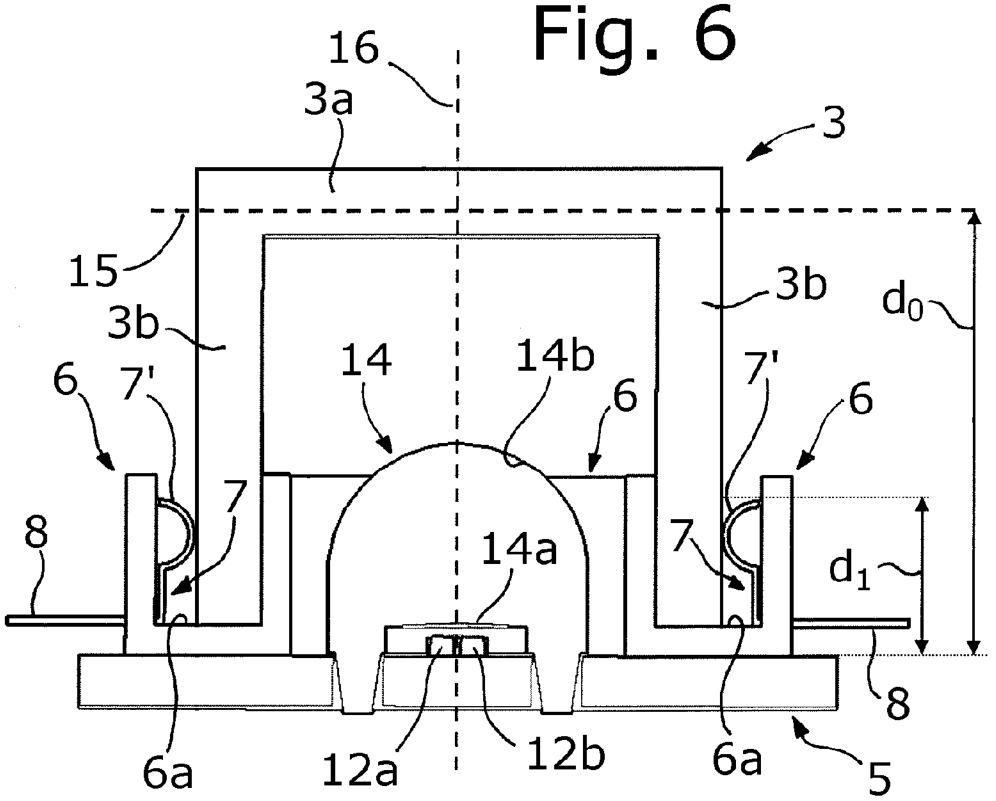
FIG. 6 illustrates a view in longitudinal section of the part of FIG. 4.
Figure 7:
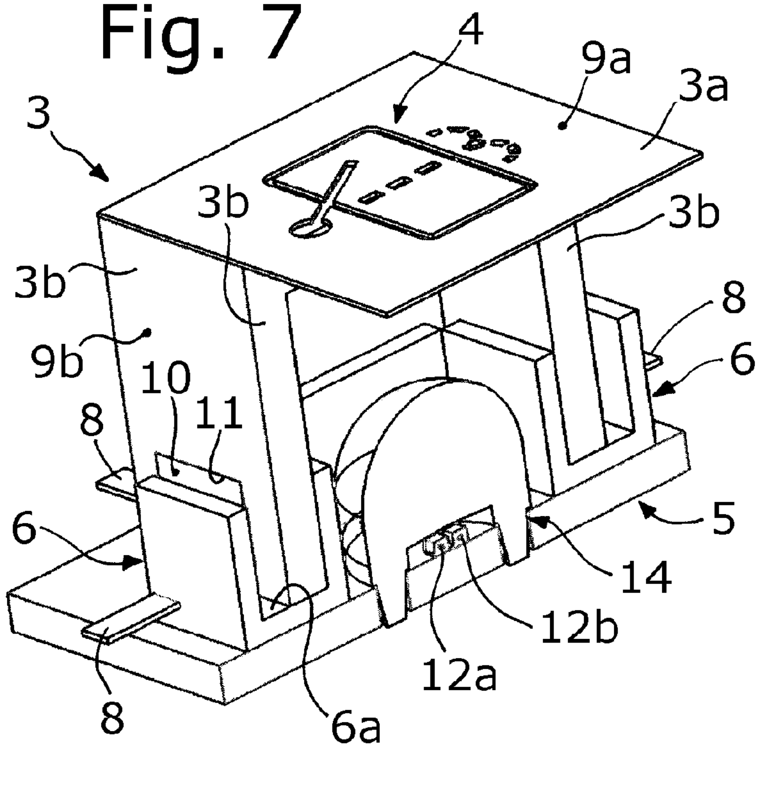
FIG. 7 illustrates a perspective view of the cross section represented in FIG. 6.

In the example, positioned on the vertical of the sources 12*a*, 12*b* is an optical module 14, having a body made of transparent material, such as, for example, polymethyl methacrylate or polycarbonate. The module 14 is configured for collecting the light emitted by the light-generating means 12*a*, 12*b* and create at output a cone of rays of pre-set semidivergence $\alpha$ and a uniform lighting profile, of pre-set shape and dimensions, in a plane designated by 15 in FIG. 6, set at a distance "$d_0$" from the base 5. In the mounted configuration, the module 14 is housed within the hollow body 3, which is open at its base. In FIG. 6 it may be noted how the upper face of the body 3 extends parallel to and in the proximity of the plane 15, or the plane 15 substantially coincides with or traverses the wall 3*a*.

Once again with reference to the particularly advantageous embodiment illustrated, the module 14 has a main optical axis, designated by 16 in FIG. 6, perpendicular to the base 5 and substantially passing through the light-generating means; in the case exemplified, the axis 16 passes through a point of the base 5 substantially coinciding with the half-distance between centres of the two sources 12*a*, 12*b*. The axis moreover passes through two optically significant surfaces 14*a*, 14*b* of the module 14, where the first surface 14*a* faces the generating means 12*a*, 12*b* and the second surface 14*b* faces the plane 15. With said configuration, the majority of the light rays emitted by the means 12*a*, 12*b* are refracted by the first surface 14*a*, traverse the body of the module 14, and are again refracted by the second surface 14*b*. The optical module 14 can hence be assimilated to a lens with focal length "f", said focal length f being determinable on the basis of the profile of the surfaces 14*a*, 14*b*, their distance apart, and the material that makes up the body of the module 14, according to the known analytic formulas of geometrical optics. It is likewise known that, in the so-called "paraxial" case, if "$S_0$" is the distance of a light source from a lens with focal length f, with $S_0$ smaller than f, on the basis of the formula $$\frac{1}{f} = \frac{1}{S_0} + \frac{1}{S_1}$$

the rays emitted by the source are refracted by the lens and deflected in such a way that the direction of the rays leaving the lens itself coincides with the direction that the rays would have had in the case where they had been emitted by a virtual source, set at a distance "$S_1$" from said lens and on the same side (with respect to said lens) of the real source of the rays. The angular semidivergence α of the cone of rays leaving said lens is such that $$\tan\alpha = \frac{\Phi/2}{S_1}$$

where Φ/2 is the half-diameter of the aforesaid lens.

Hence, it follows that, given a lens of diameter Φ and focal length f, in paraxial approximation the distance $S_0$ of the light source from said lens determines the semidivergence α of the beam of rays leaving said lens. In the case of the advantageous embodiment described, the semidivergence α of the beam of rays emitted by the light-generating means 12*a*, 12*b* and leaving the second surface 14*b* of the optical module 14 may be, to a first approximation, evaluated in a similar way.

In a preferred embodiment each of the two surfaces 14*a*, 14*b* is obtained by rotation about the optical axis 16 of a portion of conical curve (for example, the arc of a circumference, the arc of a parabola, of the arc of a hyperbole) and the uniformity of lighting on the plane 15 is achieved in an approximate way. In another preferred embodiment, at least one of the two surfaces 14*a*, 14*b* is obtained by rotation of a portion of aspherical curve, described for example by the following formula:

$$z(r) = \frac{cr^2}{1+\sqrt{1-(1+k)c^2r^2}} + \sum_i \alpha_i r^{2i}$$

(where "c" is the curvature of the surface, "k" is the conicity factor and "$\alpha_i$" are the asphericity factors) and optimized, following one of the known approaches, so that the lighting profile generated by the optical module 14 on the plane 15 set at a distance $d_0$ will be uniform.

In general terms, given the small size of the indications 4 with respect to their distance $d_0$ from the base 5 on which the light-generating means 12*a*, 12*b* are set, the surfaces 14*a*, 14*b* of the module 14 can be simple portions of spherical caps, without the lack of uniformity introduced on the lighting profile being perceived as troublesome by the user. However, in the case where the extension of the indications 4 is approximately comparable to or greater than the distance $d_0$, then it is preferable for at least one of the surfaces 14*a*, 14*b* to present an aspherical profile, in order to minimize any lack of uniformity of the lighting profile in the plane 15 and, consequently, any lack of uniformity of luminance of the indications 4 perceived by the user.

In a further embodiment, the upper wall 3*a* of the hollow body 3 has at least one of its two faces (the outer face and/or the inner face) that is not smooth, or distinguished by a certain degree of surface roughness, in such a way that a beam of collimated light impinging upon it from a direction normal to the face itself will not traverse the wall 3*a* unperturbed, but rather will be diffused, i.e., its angular divergence will be increased, with a characteristic angle of diffusion δ. It is known that, when a light beam of divergence α traverses a wall of which at least one of the two faces is a diffusing surface and is characterized by an angle of diffusion δ, then the final divergence $\alpha_f$ of said light beam leaving said wall can be, to a first approximation, determined as the quadratic sum of said initial divergence α and of said angle of diffusion δ, namely:

$$\alpha_f^2 = \alpha^2 + \delta^2$$

The presence of at least one face that diffuses with an angle of diffusion δ enables the user to perceive the uniformity of lighting of the indication 4 as uniformity of luminance. By appropriately combining the divergence α introduced by the optical module 14 with the characteristic angle of diffusion δ introduced by the surface roughness of at least one of the two faces of the top wall 3*a* it is possible to obtain, at output from the reference 4, a light beam of desired divergence $\alpha_f$ and, consequently, obtain a reference that is uniformly illuminated with an angle of visibility $\alpha_f$.

In one embodiment, in the case where the light-generating means comprises at least two sources, as in the case exemplified in the figures, the latter can have a different colour or spectral peak of emission, in such a way that the indication 4 will be perceived by the user with a different colouring according to whether just one source 12*a*, 12*b* is lit up, or else a combination of said sources with the same or different intensity.

In on embodiment, one of the two sources 12*a*, 12*b* lights up in order to back-light the indication 4 and signal the position thereof, whilst the other of said sources 12*a*, 12*b* lights up to signal activation of the command, or occurrence of the event corresponding to the indication 4.

In a possible embodiment of the invention, different from the one exemplified in the figures, the indication 4 is on an input or command element, such as a key that can be operated by the user, the body of which substantially corresponds with the body 3, and operation of which is obtained according to known techniques, for example, with a mono-stable or bi-stable push-button system carried by the base 5: in this case, the identification of the indication 4 coincides with the identification of the command associated to the key and is carried out upon starting of the motor vehicle. In another embodiment, the identification of the key is performed whenever the key is depressed, in such a way that the on-board electronics CS will simultaneously record that pressure has been applied and identification of the command associated to the pressure applied.

Of course, without prejudice to the principle of the invention, the details of construction and the embodiments may vary widely with respect to what is described and illustrated herein purely by way of example, without thereby departing from the scope of the present invention as defined in the annexed claims.

In the case of a user-interface device without back-lighting system, the body 3 may also be a non-hollow body, it being sufficient for the conductive layer 10 and the insulating layer 9*b* having the windows and/or local portions 11' to be provided on its outer walls, according to what has been described previously.

It is then evident that, if need be, the connectors 6 can be configured in such a way that the contacts 7 will co-operate with the internal face of the walls 3*b*, in which case it will be said internal face that is provided with the conductive layer 10 and insulating layer 9*b*, as well as windows 11 and local portions 11' of the insulating layer. In order to increase the encoding possibilities, moreover, first and second contacts can be provided for being set up against, respectively, the outer face and the inner face of one or more walls 3*b*, said faces being both provided with the conductive layer 10 and insulating layer 9*b*, as well as with windows 11 and/or local portions 11'.

The contacts 7 could also be associated directly to the substrate 5, i.e., without the corresponding body connector 6, and come up from said substrate in a vertical direction.

Finally, it emerges clearly that the general shape of the body of the indication elements 3, whether these are command keys or else just elements for signalling information, may be different from the one exemplified, even with a number of side walls different from the one exemplified, to which there may correspond respective connectors. It is likewise clear that the encoding means 9*b*, 10, 11, 11' described could possibly be present also on a single side wall of the body 3, providing a corresponding connector 6 with an adequate number of contacts 7.

The invention claimed is:

1. A user-interface device, which comprises:
- a plurality of indication elements for signalling of information and/or input of commands, each indication element having an individual identity and including a visual indication;
- a structure adapted for receiving the indication elements, the indication elements being in particular mounted in a relocatable way on the structure;
- wherein each indication element has a body including at least one upper face, provided with a corresponding visual indication, and one or more side faces and wherein the indication elements comprise identification means configured for co-operating with detection means of the device, for identification of the identity of the indication elements,
- characterized in that
- the identification means comprise a layer of electrically conductive material on a respective said side face, there being superimposed on the layer of electrically conductive material a layer of electrically insulating material;
- the detection means comprise one or more contact elements set up against a respective said side face;
- the layer of electrically insulating material has one or more windows for exposure of respective local portions of the underlying layer of electrically conductive material, each window being obtained substantially at a respective contact element.

2. The device according to claim 1, wherein operatively associated to at least one indication element is a lighting system, comprising light-generating means in position set at the back of the body of the indication element.

3. The device according to claim 2, wherein the lighting system comprises an optical module made of transparent material associated to the light-generating means and configured for changing the direction of rays of light emitted by said generating means, the optical module being in particular housed in a cavity of the body of the indication element.

4. The device according to claim 3, wherein the optical module is configured for generating a cone of rays of pre-set semidivergence $\alpha$ and a substantially uniform lighting profile of pre-set shape and dimensions in a plane set at a pre-set distance ($d_0$) from a substrate associated to which are the light-generating means.

5. The device according to claim 2, wherein the body of the indication element is made of a transparent material and the corresponding upper face is coated by a layer of optically non-transmissive paint, formed in which is the respective visual indication.

6. The device according to claim 2, wherein the light-generating means comprise at least two light sources having different colour or spectral emission peak.

7. The device according to claim 2, wherein said upper face belongs to an upper wall of the body of the indication element and at least one surface of said upper wall has a surface roughness configured such that a light beam impinging on said surface from a direction normal to the surface itself is diffused with an angle of diffusion.

8. The device according to claim 1, wherein the contact elements are at least in part elastically deformable and configured such that, in a respective condition of coupling with the body of the indication element, they are elastically pressed on the respective said side face of said body.

9. The device according to claim 1, wherein the detection means comprise a control system to which the interface device is operatively connected, and wherein a succession of correspondences between contact elements with respective windows and/or local portions of the electrically insulating layer provides a binary succession identifiable in a unique way by the control system.

10. The device according to claim 1, wherein the body of each indication element has a plurality of said side faces, extending on each of which is the layer of electrically conductive material and the layer of electrically insulating material, each of said side faces being provided with one or more of said windows, at least one said contact element being set up against each of said side faces.

11. The device according to claim 1, wherein a number of contact elements belong to one and the same connection member defining a reception seat for a lower region of a side wall of the body of one said indication element, one said side face belonging to said wall, with the corresponding window or windows that extends/extend at least in part in said lower region.

12. The device according to claim 1, wherein the body of at least one indication element belongs to a key for input of commands or data.

13. A method for providing a user-interface device that comprises a plurality of indication elements for signalling of information and/or input of commands, each indication element having an individual identity and including a visual indication, the method comprising the operations of:
- a) providing a structure suitable for receiving the indication elements;
- b) providing the indication elements with a respective body having an upper and one or more side faces;
- c) providing the indication elements with identification means;
- d) providing the device with detection means configured for co-operating with the identification means in order to identify the individual identity of the indication elements;
- e) mounting the indication elements on the structure, particularly in a relocatable way;
- characterized in that
- operation c) comprises the steps of:
  - a1) depositing a layer of electrically conductive paint on one or more side faces of said body;
  - a2) depositing on the layer of electrically conductive paint a layer of electrically insulating paint;
  - a3) forming in the layer of electrically insulating paint of one or more of said faces one or more windows, in order to expose respective local portions of the underlying layer of electrically conductive paint;

operation d) comprises the step of associating to the structure a plurality of contact elements designed to co-operate with one or more of said side faces of said body; and operation e) comprises the step of coupling said body to respective contact elements, in such a way that the contact elements is set up against one or more of said side faces of said body, with one or more of said contact elements substantially at one or more of said windows.

14. The method according to claim 13, wherein the windows are obtained via removal of portions of the layer of electrically insulating paint, particularly via laser ablation or etching, so as to leave locally exposed the underlying layer of electrically conductive paint, or else depositing the layer of electrically insulating paint in a selective way, in order to coat the layer of electrically insulating paint except for a desired pattern for said windows.

15. The method according to claim 13, wherein a face of said body is coated with a layer of paint of a different colouring with respect to that of said body and the visual indication is obtained via partial removal of said layer of paint of different colouring, particularly via laser ablation or etching, according to a desired pattern, leaving the underlying material constituting said body exposed, or else by depositing the layer of paint of different colouring in a selective way in order to coat said face except for the pattern desired for the visual indication, where in particular:

said body is made of a transparent material, said paint of different colouring is an optically non-transmissive paint; and operatively associated to said body is a back-lighting system comprising light-generating means.

* * * * *